April 26, 1932.  J. W. HEINEY  1,855,629
DISK BRAKE
Filed Nov. 1, 1928
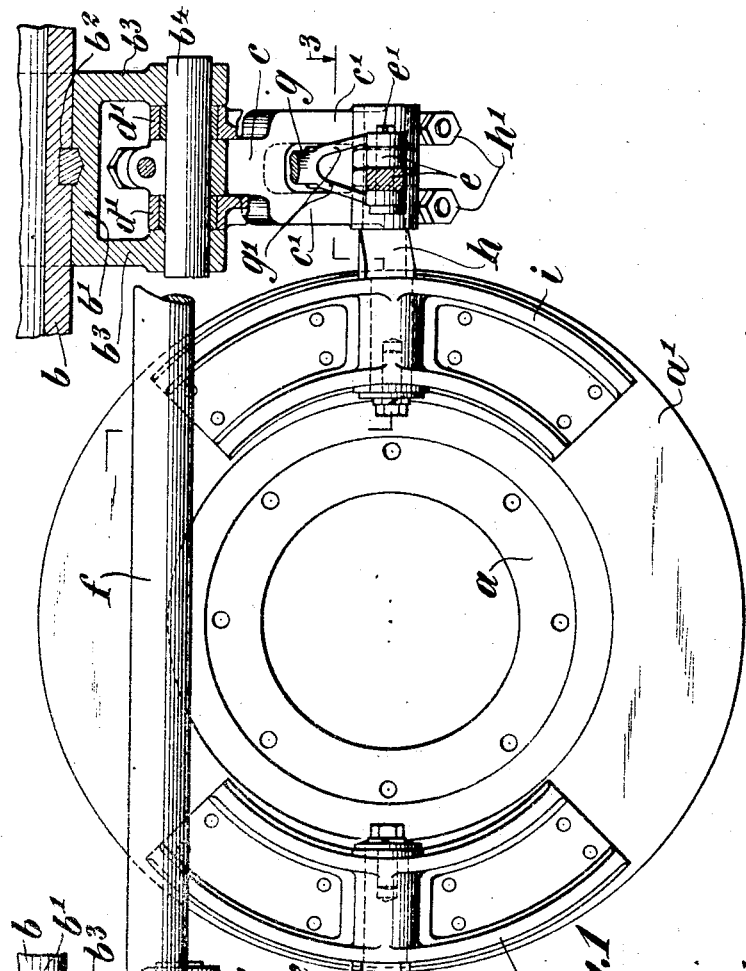
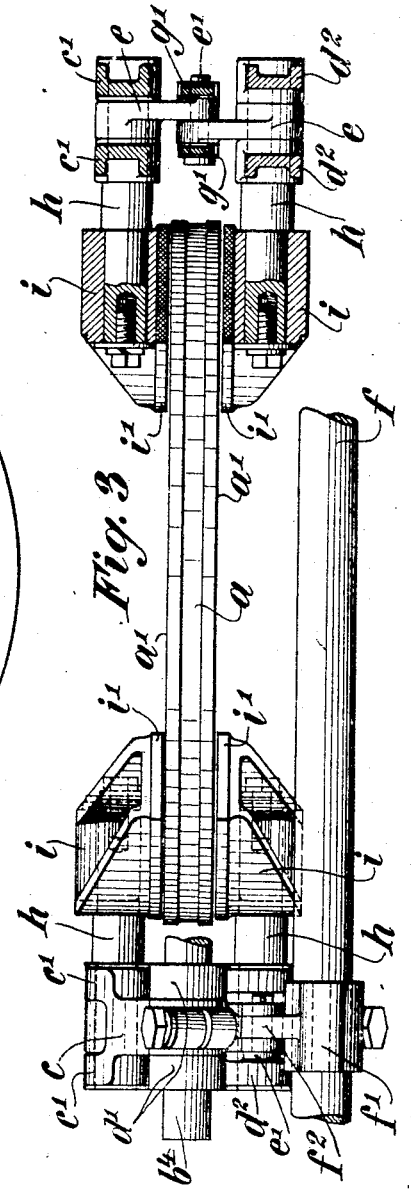
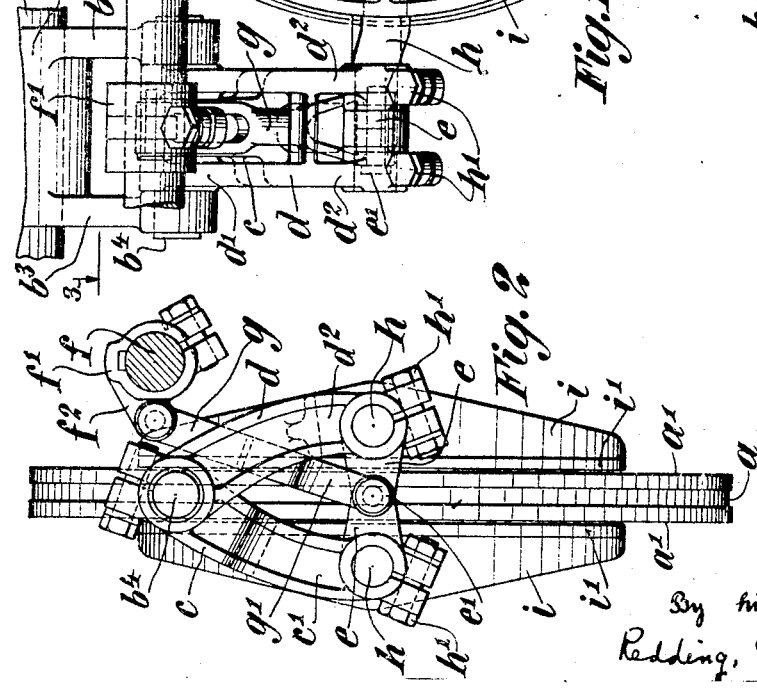
Inventor:
John W. Heiney,
By his attorneys
Redding, Greeley, O'Shea & Campbell Patented Apr. 26, 1932

1,855,629

UNITED STATES PATENT OFFICE

JOHN W. HEINEY, OF ALLENTOWN, PENNSYLVANIA, ASSIGNOR TO INTERNATIONAL MOTOR COMPANY, OF NEW YORK, N. Y., A CORPORATION OF DELAWARE

DISK BRAKE

Application filed November 1, 1928. Serial No. 316,382.

The present invention relates to brake mechanisms and embodies, particularly, an improved form of disk brake which may be effectively applied under all conditions of operation. It is proposed to provide a construction in which brake shoes are applied to the disk, or rotor, with a force sufficiently powerful to accomplish the desired braking without necessitating the use of complicated and expensive connections, such as are commonly used.

More particularly, the invention provides a plurality of brake shoes upon opposite sides of the rotor, the respective shoes on either side being simultaneously applied upon opposite faces of the rotor to effect the braking thereof. The specific manner of applying the brake shoes, as well as the mounting thereof, will be understood more fully in connection with the accompanying drawings, wherein:

Figure 1 is a view in elevation, partly in section, showing the brake shoes and mechanism mounted in proper relation to the rotor.

Figure 2 is a view in side elevation, partly in section, showing the brake mechanism of Figure 1.

Figure 3 is a view in section, taken on line 3—3 of Figure 1, and looking in the direction of the arrows.

Referring to the above drawings, $a$ designates a disk or rotor which is secured to the transmission shaft of a vehicle and provided with opposite faces $a'$ against which the brake shoes are to be applied. A reinforcing tube $b$ is mounted upon the vehicle frame and carries brackets $b'$ which are suitably secured thereto as by keys $b^2$. U-shaped extensions $b^3$ are provided on the brackets for mounting pivot shafts $b^4$, the latter having arms $c$ and $d$, respectively, pivoted thereto between the yoke members $b^5$ of the respective brackets. Arm $d$ is formed with a forked upper extremity $d'$ between the forks of which, arm $c$ is mounted. The lower extremities of each of the arms are formed with fork-shaped extensions $c'$ and $d^2$, respectively. Arms $c$ and $d$ are pivoted freely upon stub shafts $b^4$ and links $e$ are pivoted in the fork-shaped extensions of each arm, as clearly shown in Figure 3. A pin $e'$ pivots the free ends of link $e$ together and forms, in effect, a toggle joint between the arms.

A power shaft $f$ is provided with a bracket $f'$ which may be keyed thereto and provided with an extension $f^2$ between which, and the pivot point $e'$, a link $g$ extends. This link is provided with a fork-shaped extremity $g'$ within which the free ends of the link $e$ are received. Power may be applied to the shaft $f$ in any desired manner to cause it to turn in a clockwise direction as viewed in Figure 2. Such movement, transmitted through link $g$, causes the toggle joints formed by the links $e$, to collapse. Stub shafts $h$ are secured to the arms by means of clamping nuts $h'$ and plates $i$ are mounted upon the ends of the stub shafts. The axes of these shafts are formed in such manner that the ends thereof are offset with respect to the axes of the shaft portions secured by the clamping nuts $h'$. By loosening the stub shafts, the plates $i$ may be moved toward or away from the rotor $a'$, thus serving to adjust the brakes. Brake shoes $i'$ are mounted upon the opposed faces of the plates $i$ and serve to engage the braking surface $a'$ of the rotor $a$. It will be readily apparent that the movement of the power shaft $f$, as described above, will cause the brake shoes to be applied simultaneously to the opposite braking surfaces $a'$ and thus effect the desired braking.

While the invention has been described in connection with the specific construction shown in the accompanying drawings, it is not to be limited, save as defined in the appended claim.

I claim as my invention:

In brake mechanism including a rotor having parallel brake surfaces transverse to the axis thereof and a plurality of pairs of brake shoes adapted to engage the opposite faces thereof upon opposite sides of the axis, a supporting member mounted transversely of the axis of the rotor, arms pivotally carried by said supporting member to swing in a plane perpendicular thereto, means adjustably to mount the brake shoes on said arms, respectively, and means to urge the brake shoes towards the rotor.

This specification signed this 22nd day of October A. D. 1928.

JOHN W. HEINEY.